G. W. MILLAR.
PIPE COUPLING.
APPLICATION FILED MAY 5, 1908.
923,681.                                              Patented June 1, 1909.
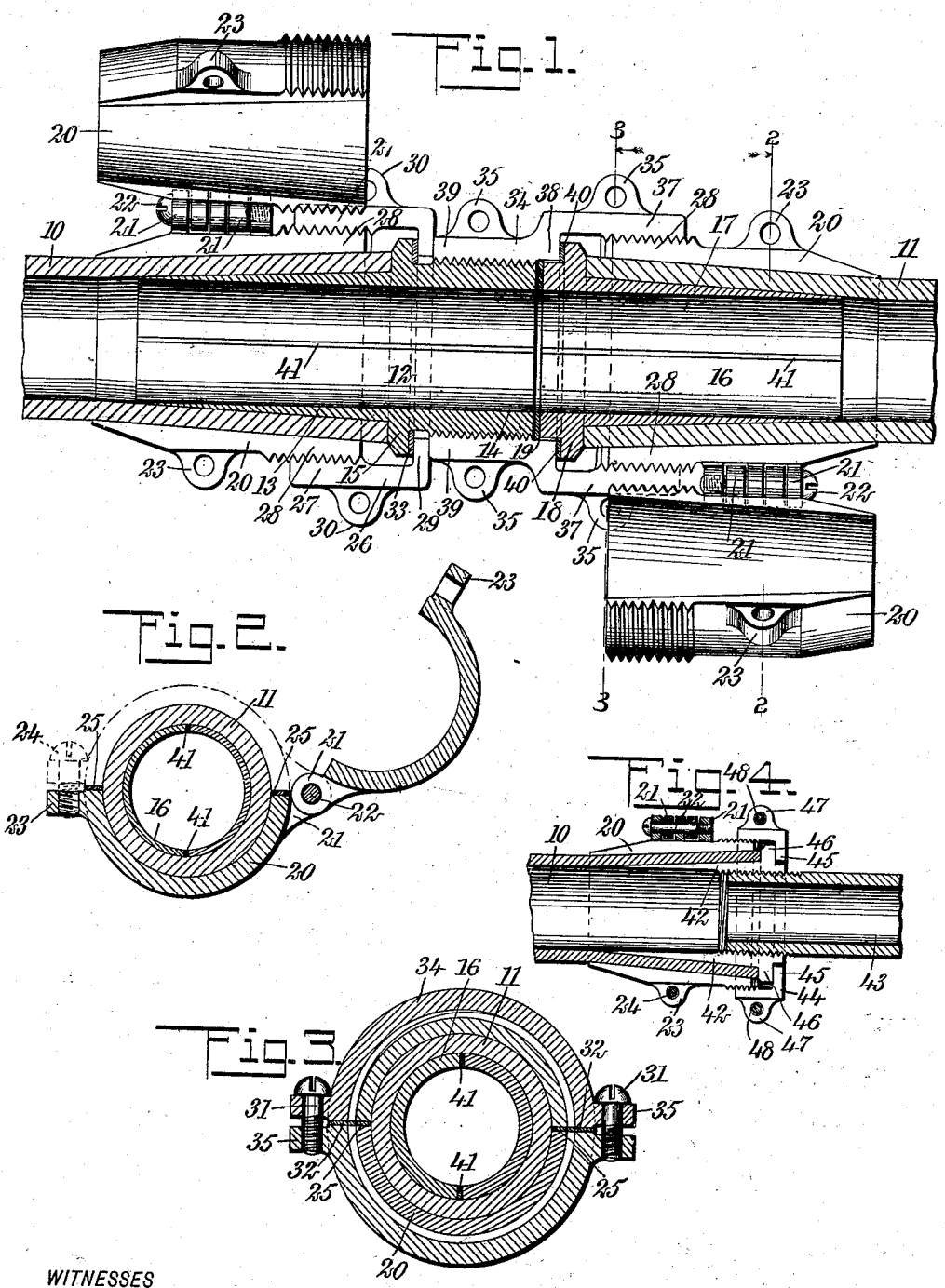

UNITED STATES PATENT OFFICE.

GEORGE W. MILLAR, OF ST. LOUIS, MISSOURI.

PIPE-COUPLING.

No. 923,681.     Specification of Letters Patent.     Patented June 1, 1909.

Application filed May 5, 1908. Serial No. 430,907.

*To all whom it may concern:*

Be it known that I, GEORGE W. MILLAR, a citizen of the United States, and a resident of St. Louis, in the county of St. Louis City and State of Missouri, have invented a new and Improved Pipe-Coupling, of which the following is a full, clear, and exact description.

This invention relates to pipe couplings, and is particularly useful in connection with lead pipes to join the ends thereof without the use of a wipe or other joint.

More specifically, the invention relates to a pipe coupling having sectional tubular expanders provided with tapered portions adapted to be inserted in pipe ends, sectional collars arranged to be mounted upon the pipe ends to jam the same upon the expanders, and sectional clamps encompassing the collars, and each engaging one of the expanders to hold the same in position, one of the clamps engaging both of the expanders to secure the parts together.

An object of the invention is to provide a simple, strong and durable pipe connection, by means of which the ends of two lead pipes can be easily and quickly joined, and which is inexpensive to manufacture, and simple in its operation.

A further object of the invention is to provide a device of the class described which comprises a plurality of sectional, tubular parts whereby the parts can be disengaged rapidly, by separating them into their sections.

A still further object of the invention is to provide a pipe coupling by means of which the ends of a lead pipe and an iron or other pipe can be joined, and by means of which, further, pipes of different diameters can be coupled.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a longitudinal section of my pipe coupling showing the same as it is used in joining the ends of two lead pipes, and having certain of the sectional parts displaced; Fig. 2 is a transverse section on the line 2—2 of Fig. 1; Fig. 3 is a transverse section on the line 3—3 of Fig. 1; and Fig. 4 is a longitudinal section showing a modified form of my coupling used to join a lead pipe and an iron pipe of different diameters.

Before proceeding to a more detailed explanation of my invention, it should be clearly understood that the same is particularly useful in connecting the ends of lead pipes, in a manner such that an air and liquid tight joint is formed, while at the same time is obviated the necessity of a permanent joint, such as a wipe joint.

The coupling can be advantageously used in plumbing work of various kinds, in coupling the ends of lead pipes incasing electric or other cables, and in other work in which it is necessary to join the separated or severed ends of tubular conduits.

The device can be fashioned from any suitable material such as cast iron, brass or the like.

Referring more particularly to the drawings, 10 and 11 represent the ends of two lead pipes which are joined or connected by means of my coupling. A sectional, tubular expander 12, having a tapered portion 13, has the latter inserted in the end of the pipe 10, which is expanded thereby, as is shown most clearly in Fig. 1. The expander has a threaded projecting end 14 and between the latter and the tapered portion, a laterally extended flange 15. The expander comprises similar, symmetrical sections which can be placed in position singly or together. A second, sectional, tubular expander 16, having a tapered portion 17 is inserted in the end of the pipe 11 to expand the same. The expander 16 has at the projecting end, a laterally extended flange 18. The ends of the pipes 10 and 11 abut respectively against the flanges 15 and 18 of the expanders. A gasket or washer 19 may be provided between the adjacent ends of the expanders to insure a tight joint.

Upon each of the outwardly tapered pipe ends 10 and 11 is mounted a sectional collar 20 suitably tapered to jam the pipe end tightly upon the expander therewithin when the collar is forced toward the extremity of the pipe. The collars comprise similar and symmetrical sections which have at adjacent edges a plurality of integral dovetailed ears 21 provided with registering openings in which is arranged a screw 22 acting as a hinge pin. At the other edges the collar sections have ears 23 provided with openings to receive a locking screw or bolt 24. Between the edges of the collars may be placed gasket or washer strips 25. It will be understood that the collar sections are hinged together and can be permanently secured, one to the other, at the edges opposite to the hinge, by means of the ears 23 and the locking screw 24. A sectional clamp 26 comprising similar and symmetrical sections, is mounted upon the collar 20 carried by the pipe 10 and has an interiorly threaded part 27 which engages the correspondingly threaded end 28 of the collar. At the end, the clamp has an inwardly disposed flange 29 which engages the flange 15 at the side thereof remote from the pipe end 10. The sections of the clamp are provided at the edges with ears 30 adapted to receive bolts or screws 31 to hold the clamp sections together. Washer or gasket strips 32 may be arranged between the edges of the clamp sections, to form tight joints. A washer or gasket 33 is preferably positioned between the flange 15 and the flange 29 to insure a tight engagement of the parts.

A sectional clamp sleeve 34 is mounted upon the pipe end 11 and comprises similar and symmetrical sections having ears 35 at the edges, which are adapted to be secured tightly together by means of screws or bolts 31. Gasket or washer strips are preferably arranged between the edges of the sections to insure a tight joint. The sleeve has one end 37 interiorly threaded so that it can operatively engage the correspondingly threaded end 28 of a collar 20. The sleeve, further, has a shoulder 38 formed by the constricted end 39. The shoulder is arranged to engage at the flange 18 of the expander 16. A washer or gasket 40, is preferably arranged between the shoulder 38 and the flange 18. The end 39 of the sleeve is interiorly threaded to engage the correspondingly threaded end 14 of the expander 12 to effect the coupling of the parts.

By suitably turning the clamp and the clamping sleeve, the collars are forced longitudinally of the pipe ends toward the extremities of the same, and thus jam the expanded pipes upon the expanders 12 and 16. At the same time, the flange 29 and the shoulder 38 are forced against the flanges 15 and 18, which, owing to the interposition of the washers or gaskets, form tight joints therewith. At the same time, the constricted end 39 of the clamp sleeve, owing to its engagement with the threaded portion 14 of the expander 12, forces the ends of the expanders together and these, together with the interposed washer or gasket, form a tight joint. When it is desired to release the parts, this can be effected rapidly, by loosening the screws 24 and 31 to separate the tubular members into their respective sections, and thus the joint can be taken apart without unscrewing the clamp and clamping sleeve.

If so desired, washer or gasket strips 41 can also be placed between the sections of the expanders 12 and 16.

In Fig. 4 is shown a method of forming a coupling between a lead pipe and an iron or other pipe which are of different diameters. An expander 42 is employed which has a constricted threaded opening formed to receive the suitably threaded end of the smaller pipe 43. The larger pipe 10 has the tapered expander inserted therein in the usual manner. One of the collars 20 is employed and a reducing clamp 44 having an inwardly disposed flange 45 adapted to engage the flange 46 of the expander. The reducing clamp, like the collar 20, is sectional, and has ears 47 at the edges of the sections, which can be secured together by means of screws or bolts 48.

Having thus described my invention, I claim as new, and desire to secure by Letters Patent:

1. A coupling, comprising sectional expanders each adapted to be inserted in a pipe end, sectional collars, each adapted to be arranged upon a pipe end, and a sectional clamping sleeve adapted to engage both said expanders and to connect the same, said sleeve being removably secured to one of said collars.

2. A coupling, comprising sectional expanders, each adapted to be inserted in a pipe end, sectional collars, each adapted to be arranged upon a pipe end, a sectional clamp adapted to be adjustably carried by one of said collars and engaging one of said expanders to jam the same in position, and a clamping sleeve adapted to be arranged upon the other of said collars and engaging the other of said expanders, said sleeve being formed removably to engage the first of said expanders to effect the coupling.

3. A coupling, comprising a sectional, tubular expander adapted to be inserted in a pipe end, said expander having a threaded portion and a flange, a second sectional, tubular expander adapted to be inserted in a pipe end and having a flange, sectional tapered collars each adapted to be mounted upon a pipe end and having threaded portions, a sectional clamp having a threaded portion adapted to engage the threaded portion of one of said collars and having a flange adapted to engage the flange of said first expander, and a clamping sleeve having a threaded portion adapted to engage the threaded portion of the other of said collars and having a shoulder adapted to engage the flange of the second of said expanders, said sleeve having a part formed removably to engage the threaded portion of said first expander to effect the coupling.

4. A coupling, comprising a sectional expander having a tapered end adapted to be inserted in a pipe end, a threaded end, and intermediate said ends a flange, a second sectional expander having a tapered end adapted to be inserted in a pipe end, and a flange, sectional tapered collars adapted to be mounted upon the pipe ends and having threaded portions, a sectional clamp, threaded adjustably to engage one of said collars, and having an inwardly disposed flange adapted to engage said flange of said first expander, and a clamping sleeve having a portion threaded adjustably to engage the other of said collars and having a shoulder adapted to engage said flange of said second expander, said sleeve having a constricted, interiorly threaded part adapted to engage said threaded end of said first expander, said sectional parts having means for removably securing the sections together.

5. A coupling, comprising expanders, each adapted to be inserted in a pipe end, collars each adapted to be arranged upon a pipe end, and a clamping sleeve adapted to be removably mounted upon one of said collars and to engage both of said expanders.

6. A coupling, comprising expanders each adapted to be inserted in a pipe end, collars each adapted to be arranged upon a pipe end, one of said collars serving to hold the first of said expanders in place, and a clamping sleeve adapted to be removably mounted upon the second of said collars and serving to hold the second of said expanders in place, said sleeve engaging the first of said expanders and connecting said expanders.

7. A coupling, comprising expanders, each having a tapered portion adapted to be inserted in a pipe end, collars each adapted to be arranged upon a pipe end, a clamp adapted to be adjustably carried by one of said collars and engaging one of said expanders to jam the same in position, and a clamping sleeve adapted to be arranged upon the other of said collars and engaging the other of said expanders, said sleeve being formed removably to engage the first of said expanders to effect a coupling.

In testimony whereof I have signed my name to this specification in the presence of two subscribing witnesses.

GEORGE W. MILLAR.

Witnesses:
    JAS. M. KENNEDY,
    M. CASWELL LEWIS.